United States Patent
Pezzuti et al.

(10) Patent No.: US 8,851,210 B2
(45) Date of Patent: Oct. 7, 2014

(54) DEVICE FOR MOVING VEHICLES

(75) Inventors: Eric J. Pezzuti, Jupiter, FL (US); James J. Pezzuti, Jupiter, FL (US)

(73) Assignee: Ertosh Mfg., Co., LLC, Jupiter, FL (US)

( * ) Notice: Subject to any disclaimer, the term of this patent is extended or adjusted under 35 U.S.C. 154(b) by 230 days.

(21) Appl. No.: 13/305,983

(22) Filed: Nov. 29, 2011

(65) Prior Publication Data

US 2012/0138374 A1    Jun. 7, 2012

Related U.S. Application Data

(60) Provisional application No. 61/417,763, filed on Nov. 29, 2010.

(51) Int. Cl.
    *B62M 7/14* (2006.01)
    *B66F 7/24* (2006.01)
    *B60S 13/00* (2006.01)

(52) U.S. Cl.
    CPC *B60S 13/00* (2013.01); *B66F 7/246* (2013.01)
    USPC .......................................................... 180/11

(58) Field of Classification Search
    CPC ................................ B60S 13/00; B60S 13/02
    USPC ............ 180/11, 198, 209, 14.7, 342, 343, 16; 280/767, 79.4, 480, 480.1
    See application file for complete search history.

(56) References Cited

U.S. PATENT DOCUMENTS

| | | | | |
|---|---|---|---|---|
| 770,936 | A * | 9/1904 | Simpson | 180/11 |
| 1,275,716 | A | 8/1918 | Maurer, Jr. | |
| 2,966,222 | A * | 12/1960 | Lambert, Jr. | 254/2 R |
| 4,346,772 | A * | 8/1982 | Clifft | 180/11 |
| 4,687,070 | A * | 8/1987 | Ricciardi | 180/14.7 |
| 5,113,959 | A * | 5/1992 | Mastov et al. | 180/11 |
| 5,180,177 | A * | 1/1993 | Maki | 280/47.15 |
| 7,117,835 | B2 * | 10/2006 | Zimmerman | 123/179.25 |
| 7,578,066 | B1 * | 8/2009 | Pellegrino | 33/203.18 |
| 2004/0146384 | A1 * | 7/2004 | Whelan | 414/426 |
| 2008/0308325 | A1 * | 12/2008 | Hart | 180/11 |

FOREIGN PATENT DOCUMENTS

| | | | | |
|---|---|---|---|---|
| DE | 19811922 | | 9/1999 | |
| SU | 1291468 | | 2/1987 | |
| WO | WO 8501265 | A1 * | 3/1985 | B64F 1/22 |
| WO | WO 8706542 | A1 * | 11/1987 | B60P 3/11 |
| WO | WO2006131608 | | 12/2006 | |
| WO | WO2008055309 | | 5/2008 | |

\* cited by examiner

*Primary Examiner* — Kevin Hurley
(74) *Attorney, Agent, or Firm* — McHale & Slavin, P.A.

(57) ABSTRACT

The present invention relates to a device and method for moving a disabled vehicle. More specifically, the invention includes a main frame assembly that is constructed and arranged for placement and adjacent to the outside portion of a vehicle wheel to allow one operator movement of the vehicle. An electric motor and battery(s) operate through a gear train to rotate an adapter plate in both forward and reverse directions. The adapter plate is constructed and arranged to cooperate with the lug nuts or wheel studs to provide rotation to the wheel upon operation of the electric motor. A hand or remotely operable controller is provided for the operation of the electric motor which allows for operation of the device while walking alongside or sitting at the driver's position within the vehicle.

18 Claims, 6 Drawing Sheets

DEVICE FOR MOVING VEHICLES

CROSS REFERENCE TO RELATED APPLICATIONS

This application claims priority under 35 USC 119(e) to the U.S. Provisional Patent Application No. 61/417,763, filed Nov. 29, 2010, entitled, "A ONE MAN OPERATED MOTORIZED VEHICLE MOVER THAT ATTACHES TO THE WHEEL OF A VEHICLE," the entire disclosures of which are incorporated herein by reference.

FIELD OF INVENTION

The present invention generally relates to vehicles, and more particularly to a device for moving disabled vehicles from one point to another.

BACKGROUND INFORMATION

A vehicle, by definition, is a mobile object. While an automobile is a wheeled vehicle that carries its own engine or motor and transports passengers. The vehicle or automobile we know today was not invented in a single day by a single inventor, but instead reflects an evolution that has taken place over more than one hundred years. Distinct variations in the design and construction of automobiles have created numerous systems and components that are difficult or impossible to diagnose and repair at the roadside. Motor vehicles, such as automobiles, trucks and semi-trucks, are self powered in that they contain an engine, motor or other power means coupled through a transmission to wheels of the vehicle. Thus, motor vehicles are capable of self locomotion. Trailers and similar vehicles, however, must be attached to another vehicle because they lack their own power source. Generally, trailers are pulled behind a motor vehicle, such as a car, truck or semi-truck.

Motor vehicles, due to their complexity, have occasional mechanical breakdowns which cause the vehicle to become disabled. For instance, a motor could stop operating or a transmission could fail to transmit power. Unless power can be generated and transmitted to the wheels of a motor vehicle, the motor vehicle is not capable of self movement. Trailers, as mentioned above, generally do not include a self-powering mechanism and must, therefore, always be moved by applying power from another source. In addition, many trailers are equipped with sophisticated braking systems that are prone to failure.

Typical methods for moving a disabled motor vehicle include pushing, pulling or towing the disabled vehicle with a second vehicle. Moving trailers typically involves pulling or towing the trailer by hand or with a second vehicle.

However, it is sometimes inconvenient to move one vehicle with another. Towing-type vehicles are generally expensive and difficult to operate. Also, because it is not the purpose of motor vehicles to be towed, damage can occur when attaching the disabled vehicle to the tow vehicle, or during the towing itself. Additionally, motor vehicles are not primarily designed to be pushed or pulled, and damage to the body or running gear of the vehicle may occur during such action. Although trailers are intended to be pulled by another vehicle, sometimes no pulling vehicle is available. When this occurs, the trailer typically cannot be moved.

Various devices for moving disabled or non-powered vehicles have been proposed over the years. One such device is the wheel-dolly. Wheel-dollies can be defined by design and usage into four basic types.

A first wheel-dolly is used to remove and replace wheel assemblies and brakes on vehicles. It is probably the most widely used type of wheel-dolly. It is a shop tool for use with a dismounted wheel assembly and requires movement of the vehicle by hand. In use, the dolly's wheels roll transversely to the wheel it carries.

A second type of wheel-dolly is used in pairs or sets of four to move vehicles within a garage or shop. This type of dolly supports each wheel affixed to vehicle on a plurality of casters, allowing movement of a vehicle in any direction when maneuvered by hand on a hard surface. For example, H. E. Maurer, Jr., U.S. Pat. No. 1,275,716, August 1918, provided a wheel-dolly on casters that, when used under each wheel, would elevate an automobile so that it could readily be rolled around in limited space, especially within garages.

A third type of wheel-dolly is designed to carry an immobile wheel on a road or street. This dolly's wheels roll parallel with the wheel it carries. It is installed on wheel affixed to towed vehicle's trailing axle in conjunction with leading axle of vehicle being carried by a tow truck. A towing dolly carrying both wheels of trailing axle is more widely used than individual wheel-dollies.

One drawback associated with wheel-dollies is the requirement for the vehicle to be lifted so that a wheel or a portion of the suspension can be placed upon the dolly, whereby the dolly carries the weight of the vehicle. Once moved, the vehicle must then be removed from the dolly. Another drawback relates to movement of the vehicle once placed upon the dolly. Movement of the vehicle must still be completed by hand or with a tow vehicle, severely limiting the advancement in art provided by wheel-dollies.

Another known approach to moving disabled vehicles is the tractor style pusher. A tractor style pusher typically resembles a front tine garden tiller having a rubber push bumper in place of the rotating tines. In operation, a user simply abuts the push bumper to a portion of the vehicle and engages the gearing to push against the vehicle.

One shortcoming associated with this type of device is damage to the pushed vehicle. Inevitably, the push bumper will damage the fragile paint and plastic bumper covers provided on modern vehicles. Another shortcoming is that moving a vehicle with one of these devices requires at least two people. One to operate the tractor style pusher and one to steer the vehicle as it is moved.

Therefore, what is needed in the art is a device for moving vehicles that does not require the vehicle to be lifted for placement upon the device. The device should also provide a means for locomotion to the disabled vehicle whereby persons or a tow vehicle are not needed. The vehicle mover should also be operable by a single individual.

Finally, there are ergonomic needs that a vehicle mover must satisfy in order to achieve acceptance by the end user. The vehicle moving device must be easily and quickly attachable to the disabled vehicle using minimal hardware and requiring a minimal number of tools. Further, the vehicle mover should not require excessive strength to attach or include heavy component parts.

Thus, the present invention provides a vehicle mover which overcomes the disadvantages of prior art devices. The vehicle mover of the present invention not only provides for relative ease in attachment and operation, it also permits one operator movement of a vehicle without the need to provide additional persons for steering or additional vehicles to provide locomotion of the disabled vehicle.

SUMMARY OF THE INVENTION

Briefly, the invention involves a device and method for allowing a single person to move a disabled vehicle. The system includes a main frame assembly that is constructed and arranged for placement adjacent to the outside portion of a vehicle wheel. Guide wheels are secured to the main frame to support the weight of the vehicle mover, and guide rollers extend from the main frame around the wheel to a back portion thereof to prevent the frame from moving away from wheel. An electric motor and battery(s) operate through a gear train to rotate an adapter plate in both forward and reverse directions. The adapter plate is constructed and arranged to cooperate with the lug nuts or wheel studs to provide rotation to the wheel upon operation of the electric motor. A hand operable or remote control switch assembly is provided for the operation of the electric motor which allows for operation of the device while sitting at the driver's position within the vehicle.

Accordingly, it is an objective of the present invention to provide a device for moving a vehicle.

It is a further objective of the present invention to provide a device for moving a vehicle that can be operated by one person.

It is yet a further objective of the present invention to provide a device for moving a vehicle that can be secured to a vehicle without raising the vehicle from a ground surface.

It is another objective of the instant invention to provide a device for moving a vehicle that attaches directly to a wheel of the vehicle.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENTS

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Figure 1:
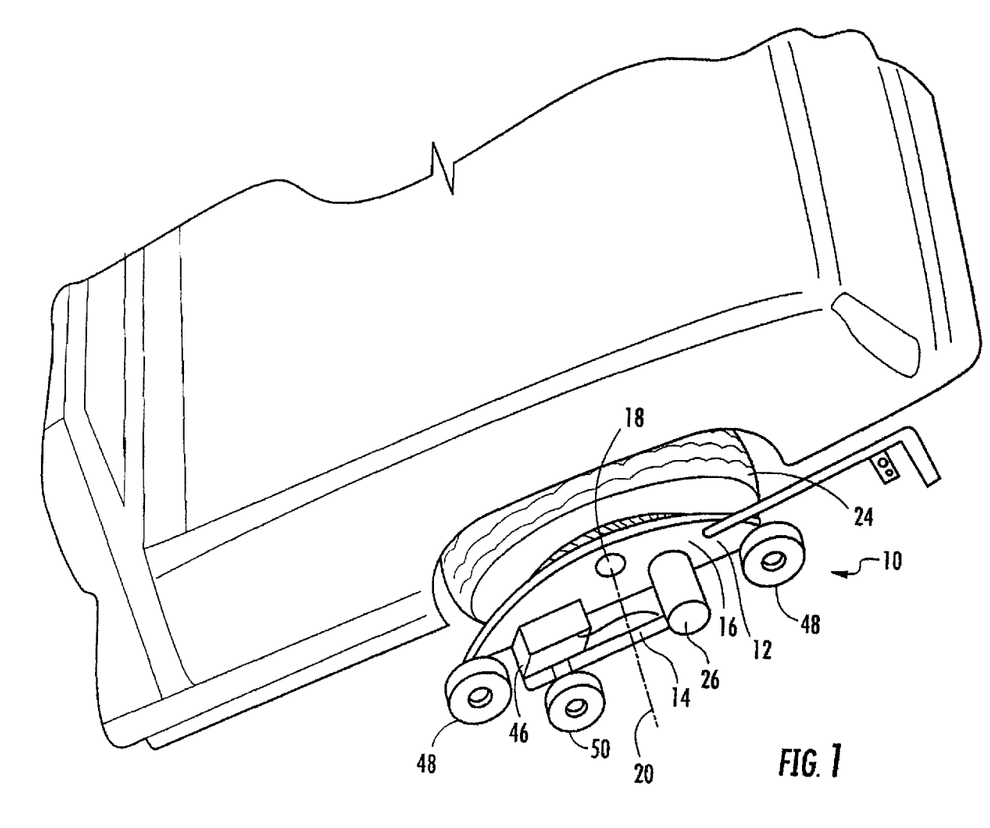
FIG. 1 is a top perspective view of one embodiment of the instant invention.
Figure 2:
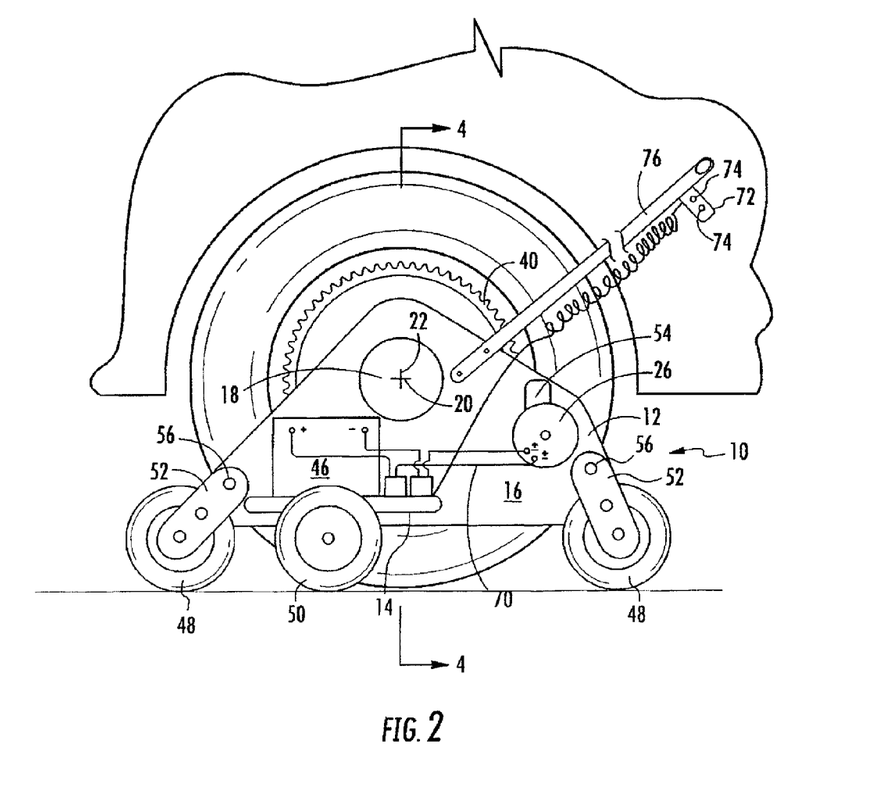
FIG. 2 is a front view of the embodiment shown in FIG. 1 illustrating the vehicle mover connected to a vehicle wheel.

Referring generally to FIGS. 1-8, a vehicle moving device 10 for moving a disabled vehicle is illustrated. The system generally includes a frame assembly 12, a spindle assembly 18, a motor 26, and a gear train 28. The frame assembly is generally constructed and arranged to provide a stable structure with mobility upon which the spindle, motor and gear train can be secured adjacent to an outer portion of a vehicular wheel assembly 24 to provide mobility to the vehicle. The frame assembly of the preferred embodiment includes a substantially horizontal portion 14 and a substantially vertical portion 16, the vertical portion 16 being securable adjacent to the outer portion of the vehicular wheel assembly 24. In a preferred embodiment, at least two guide wheels 48 and at least one balance wheel 50 are secured to the frame assembly to provide portability to the device when not secured to a vehicle. In at least one embodiment, the guide wheels and balance wheel(s) are secured to the frame assembly in a spaced apart and substantially parallel relationship with respect to each other to rotate along a path substantially parallel to the vertical portion of the frame assembly. Adjustment brackets 52 can be utilized to raise and lower the frame assembly with respect to a ground surface so that the axis of rotation for the spindle 20 aligns or can be aligned with the axis of rotation 22 for the vehicular wheel assembly 24 as shown in FIG. 2. In one embodiment, the adjustment brackets rotate about the adjustment bracket fasteners 56 to provide the up and down adjustment of the device. It should be noted that elongated slots, rail systems and the like, suitable for adjusting the wheels up and down, can be utilized in place of the adjustment brackets without departing from the scope of the art.

Figure 3A:
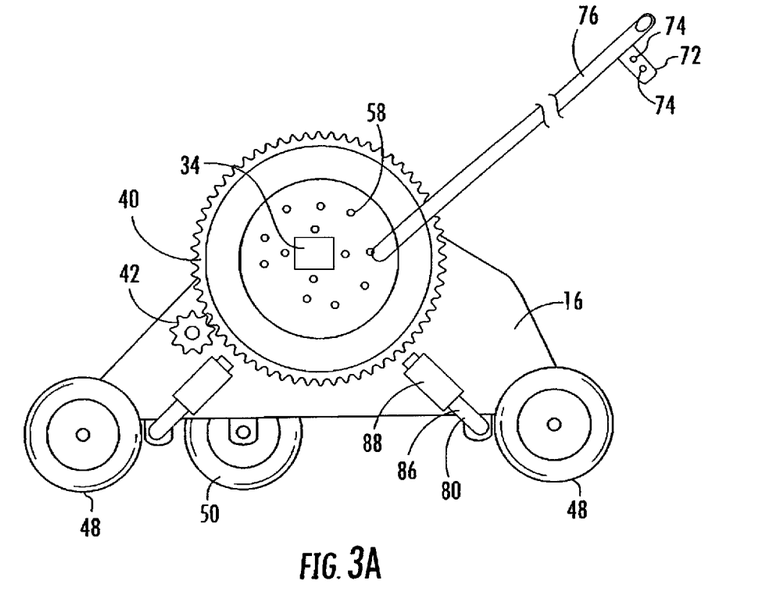
FIGS. 3A and 3B represent rear views of the embodiment illustrated in FIG. 1.
Figure 3B:
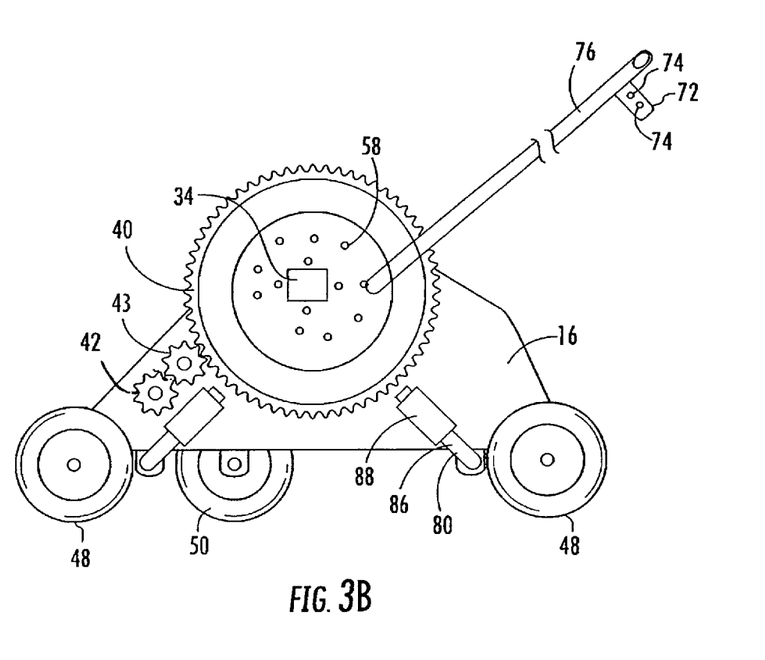
Figure 4:
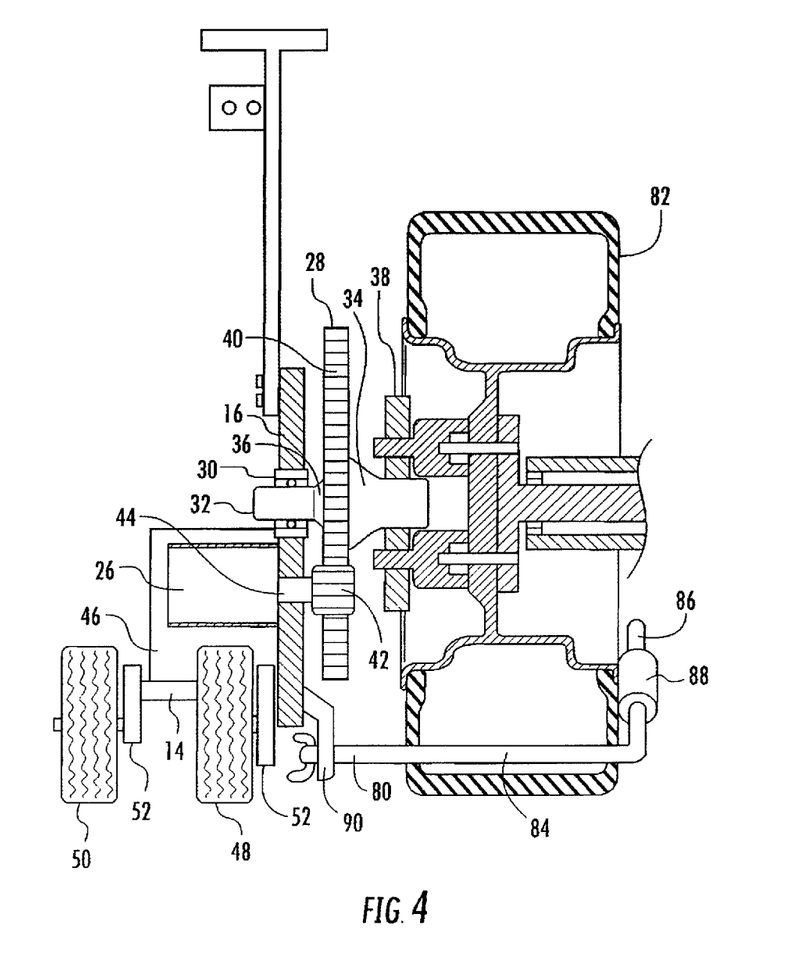
FIG. 4 is a partial section view taken along lines 4-4 of FIG. 2, illustrating the cooperation between the vehicle mover and a vehicle wheel.

Referring to FIGS. 3 and 4, the wheel backing arm 80 is illustrated. The wheel backing arm is preferably secured to the vertical portion 16 of the frame assembly 12. The wheel backing arm is substantially L-shaped and a first leg 84 extends from the vertical portion of the frame assembly around the vehicular wheel assembly 24 to a rear surface 82 thereof. The second leg 86 extends inwardly along said rear surface toward the axis of rotation to prevent the frame assembly from moving away from the vehicular wheel assembly. Rollers 88 may be provided to reduce friction between the rear surface 82 of the wheel assembly and the second leg 86 of the wheel backing arm. Backing arm adjusters 90 are provided to accommodate different sized wheel and tire assemblies.

Figures 6, 7:
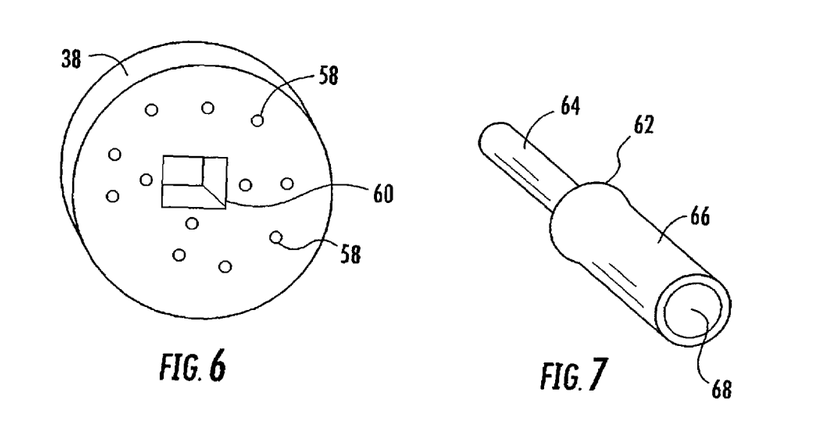
FIG. 6 is a perspective view of one embodiment of the adapter plate of the present invention.
FIG. 7 is a perspective view of one embodiment of the lug nut adapters of the present invention.
Figure 8:
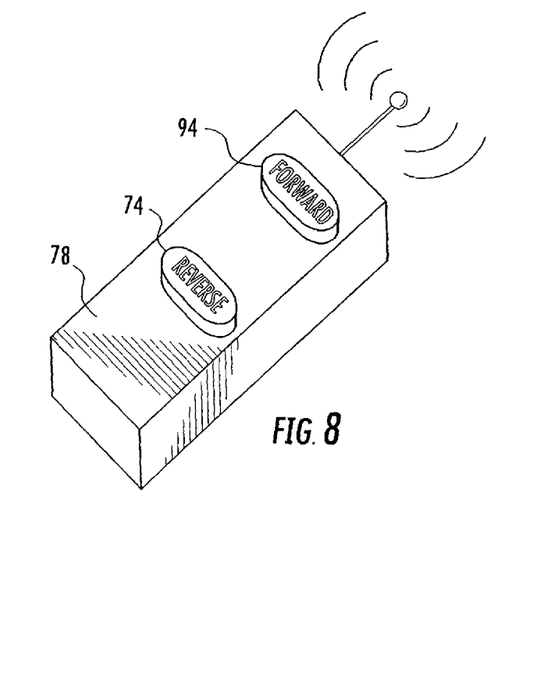
FIG. 8 is a perspective view of one embodiment of a remote control fob of the present invention.

A spindle assembly 18 is secured to the vertical portion 16 for rotation about a spindle axis 20. Spindle bearings 30 are provided to allow for controlled rotation about the spindle axis. The spindle includes a first end 32 shaped and sized to cooperate with the spindle bearings 30. The second end 34 of the spindle 18 includes a polymeric shape, key or the like which cooperates with an adapter plate 38 to provide synchronized rotation therebetween. The central portion 36 of the spindle 18 is constructed for attachment of a portion of the gear train 28 which provides connection to a motor 26 while causing the spindle assembly to rotate at a lesser speed than the output shaft of the motor 26. The adapter plate 38 is generally a flat disc shaped element having a plurality of apertures 58 therein corresponding to predetermined vehicular wheel assembly bolt patterns. A central aperture 60 having a shape that is substantially conjugate in shape to the second end of the spindle 34. In a most preferred embodiment, the second end of the spindle and the central aperture of the adapter disc are square in shape. In this manner, the adapter plate can slide along the length of the spindle as needed for alignment purposes to accommodate wheel assemblies that have different wheel offsets and tire sizes. Lug nut adapters may be provided to connect between the adapter plate 38 and the wheel assembly 24. The lug nut adapters include a first end 64 constructed and arranged to cooperate with at least one of said adapter plate apertures 58 and a second end 66 constructed and arranged to cooperate with a stud and/or nut assembly of the vehicular wheel assembly to provide selective rotation thereto. In at least one embodiment, the second end of the lug nut adapters include a blind aperture 68 therein sized to slip over the stub and/or lug nut of the wheel assembly.

Referring to FIGS. 3 and 4, one embodiment of the gear train 28 is illustrated. In this embodiment, the gear train 28 includes a ring gear 40 secured about the central portion of the spindle which cooperates with a drive gear 42 secured to the output shaft 44 of the motor 26. Idler gears 43 (FIG. 3B) or the like may be utilized to provide increased spacing, different drive ratios or different angulations between the components as is known in the art. It should also be noted that while straight cut spur type gears are illustrated, other types, styles and combinations of gears may be utilized to construct the gear train without departing from the scope of the art.

Referring to FIGS. 1, 2 4 and 7, one embodiment of the motor 26 is illustrated. The motor 26 is preferably secured to the frame assembly 12 so that the output shaft 44 extends through the vertical portion 16. Drive gear 42 is secured to the output shaft for rotation therewith. A starter bendix and solenoid combination 54 (FIG. 2) may also be utilized to move the drive gear into engagement with the gear train. A portable power source for the motor, in the form of at least one battery 46, is secured to the horizontal portion of the frame assembly. Electrical wires 70 extend between the battery 46, motor 26 and pendant controller 72 for operational control of the motor. The pendant controller 72 includes a plurality of switches 74 for operation of the forward and reverse characteristics of the motor. The frame assembly may include a guide handle 76 secured thereto for locomotion of the device when not attached to a disabled vehicle. The guide handle may be configured for attachment of the pendant controller for operation of the device while walking beside the vehicle. Alternatively, the pendant controller may be removed from the guide handle and extended to the operational position of the vehicle to allow the operator to steer the vehicle while controlling the device. Still yet, a remote control fob 78 (FIG. 8) may be provided to allow for wireless operation of the device. The fob may utilize infrared, RF, Bluetooth, high frequency, low frequency cell technology, Zigby® chip or any other suitable means of providing wireless communication between the device 10 and the fob.

Figure 5:
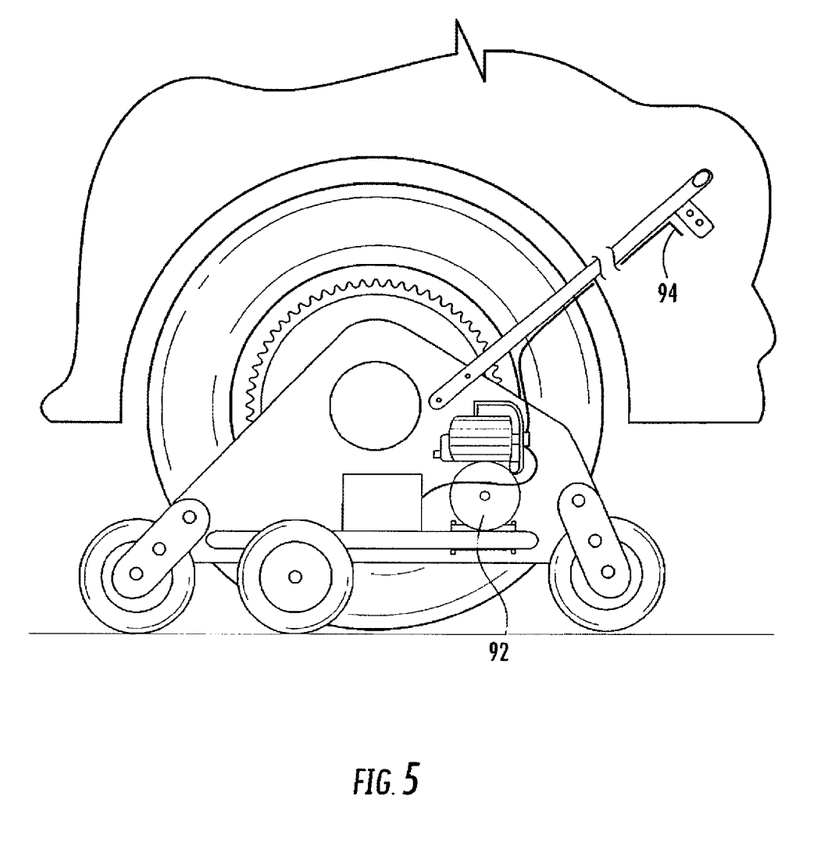
FIG. 5 is a front view of an alternative embodiment of the present invention having an internal combustion engine.

Referring to FIG. 5, an alternative embodiment of the present invention is illustrated. In this embodiment, the motor 26 is replaced by an internal combustion engine 92. The drive gear 42 of the gear train 28 may be directly placed on the output shaft of the engine 92, or alternatively a clutch mechanism may be provided between the two. For example, a centrifugal clutch may be utilized to provide intermittent operation of the device. A trigger mechanism 94 or the like may be utilized to control throttle operation of the internal combustion engine.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification. One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A device for moving a disabled vehicle comprising:
   a frame assembly including a substantially vertical portion and a substantially horizontal portion, said vertical portion securable adjacent to an outer portion of a vehicular wheel assembly;
   a spindle assembly secured to said vertical portion for rotation about a spindle axis, said spindle axis being substantially aligned with a wheel axis of rotation, said spindle including an adapter plate, said adapter plate having a plurality of apertures therein corresponding to predetermined vehicular wheel assembly bolt patterns so that said adapter plate cooperates with at least two wheel studs to provide motive force for rotation of said wheel;
   a motor secured to said frame assembly for providing controlled rotation to said spindle assembly;
   a gear train secured between an output shaft of said motor and said spindle assembly, said gear train being constructed and arranged to cause said spindle assembly to rotate at a lesser speed than said output shaft of said motor.

2. The device for moving disabled vehicles of claim 1 further including at least one battery for providing a portable power source for said motor, said battery secured to said horizontal portion of said frame assembly.

3. The device for moving disabled vehicles of claim 1 including at least two guide wheels, said guide wheels positioned to be substantially parallel to said vertical portion of said frame assembly while engaging a ground surface.

4. The device for moving disabled vehicles of claim 3 including at least one balance wheel, said at least one balance wheel positioned to be spaced apart from said guide wheels and substantially parallel thereto said guide wheels and said at least one balance wheel providing support and mobility to said device for moving disabled vehicles.

5. The device for moving disabled vehicles of claim 4 wherein said at least two guide wheels and said at least one balance wheel are adjustable in height to accommodate different sized said vehicular wheel assemblies.

6. The device for moving disabled vehicles of claim 1 including a plurality of lug nut adapters, said lug nut adapters including a first end constructed and arranged to cooperate with at least one of said adapter plate apertures, said lug nut adapter including a second end constructed and arranged to cooperate with a stud and nut assembly of said vehicular wheel assembly.

7. The device for moving disabled vehicles of claim 1 wherein said horizontal portion of said frame assembly includes a wheel backing arm, said wheel backing arm configured to extend from said vertical portion of said frame assembly around said vehicular wheel assembly to a rear surface thereof whereby said wheel backing arm engages a rear surface of said vehicular wheel assembly, said wheel backing arm being constructed and arranged to prevent said vertical portion of said frame assembly from moving away from said outer portion of said vehicular wheel assembly.

8. The device for moving disabled vehicles of claim 7 wherein said wheel backing arm is adjustable to provide for different sized vehicular wheel assemblies.

9. The device for moving disabled vehicles of claim 7 wherein said wheel backing arm includes at least one roller positioned for rotation about said wheel backing arm, said at least one roller positionable to cooperate with said rear surface of said vehicular wheel assembly.

10. The device for moving disabled vehicles of claim 1 wherein said motor is an electric motor.

11. The device for moving disabled vehicles of claim 1 wherein said motor is a starter motor having a bendix on said output shaft.

12. The device for moving disabled vehicles of claim 1 wherein said motor is an internal combustion engine.

13. The device for moving disabled vehicles of claim 1 wherein said gear train includes a ring gear secured about said spindle and wherein said motor output shaft includes a gear thereon, said output shaft gear constructed and arranged for at least intermittent engagement with said ring gear for rotation thereof.

14. The device for moving disabled vehicles of claim 13 wherein said gear train includes at least one idler gear in intermeshing engagement with said ring gear and at least intermittent engagement with said gear positioned on said output shaft of said motor.

15. The device for moving disabled vehicles of claim 1 including a pendant controller for operation of said motor, wherein electrical wires extend between said pendant and said motor, said pendant including electrical switches for operational control of said motor.

16. The device for moving disabled vehicles of claim 1 including a remote control pendant for operation of said motor, said pendant including electrical switches for operational control of said motor.

17. The device for moving disabled vehicles of claim 1 wherein said frame assembly further includes a guide handle secured thereto, said guide handle constructed and arranged for locomotion of said device for moving disabled vehicles when not attached to a disabled vehicle.

18. The device for moving disabled vehicles of claim 17 wherein said guide handle includes at least one electrical switch for operation of said motor.

* * * * *